Sept. 9, 1958     T. W. NELSON     2,851,683
BEARING SIGNAL SELECTORS
Filed May 24, 1955
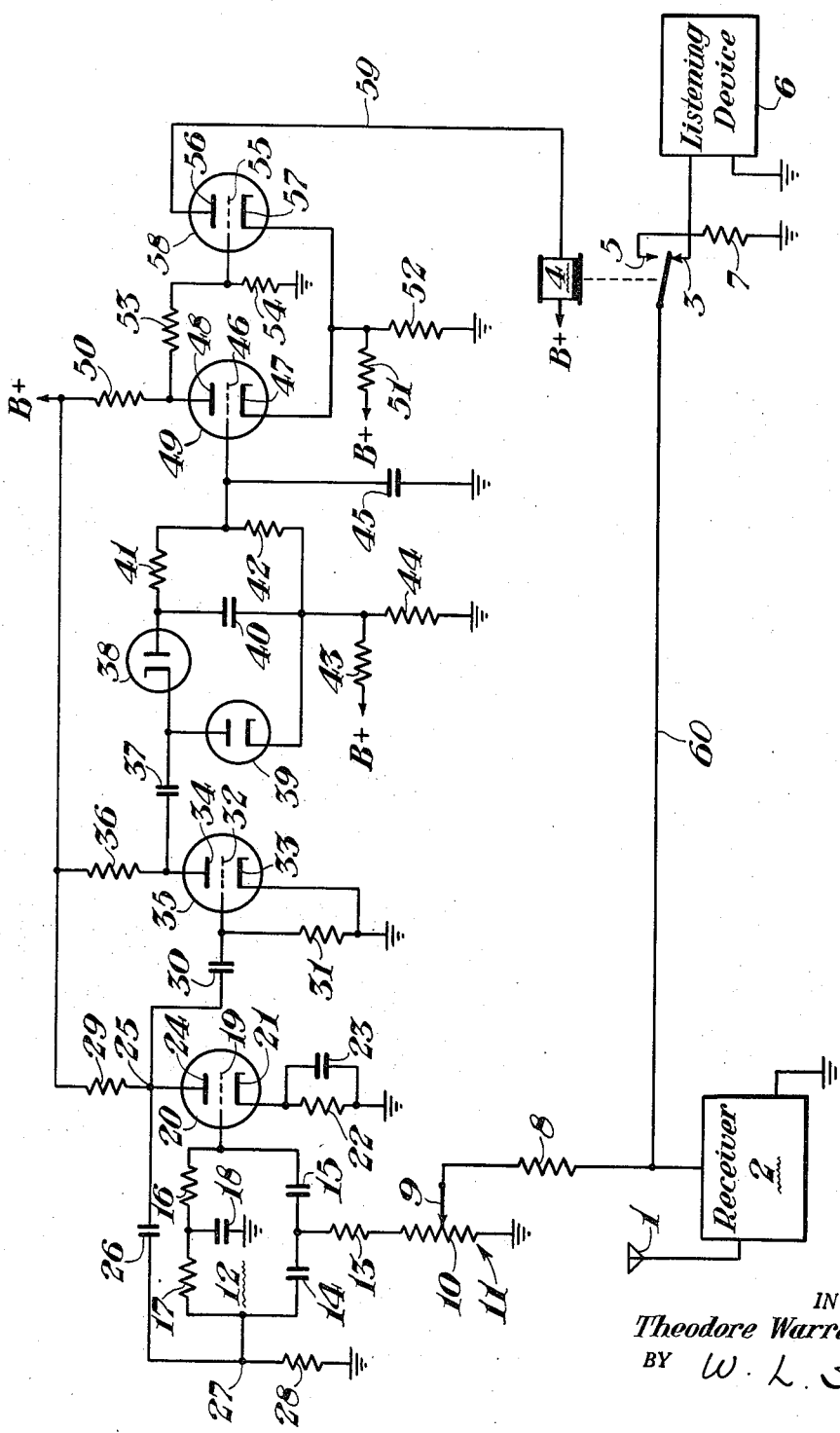
INVENTOR.
Theodore Warren Nelson
BY W. L. Stout.
HIS ATTORNEY

United States Patent Office 2,851,683
Patented Sept. 9, 1958

2,851,683

BEARING SIGNAL SELECTORS

Theodore Warren Nelson, Annandale, Va., assignor to Westinghouse Air Brake Company, Wilmerding, Pa., a corporation of Pennsylvania Application May 24, 1955, Serial No. 510,745

7 Claims. (Cl. 343—106)

This invention relates to omnidirectional range systems for aerial navigation, and particularly to a bearing signal selector therefor.

Omnidirectional range equipment for aerial navigation has been developed, in which a ground station is provided for broadcasting bearing information to pilots flying within a predetermined range of the station. The broadcast information may be presented to the pilot in the form of both visual and aural indications, by means of such equipment as that, for instance, shown and described in application Serial No. 378,797, filed September 8, 1953 by Vernon I. Weihe, which has issued as Patent No. 2,804,615, dated August 27, 1957, and assigned to the assignee of the present application.

In such a system, the transmitting station comprises an omnidirectional antenna modulated with a voice reciting selected bearings around the compass at prescribed intervals, and a rotating antenna radiating a figure eight pattern modulated with a continuous tone of selected frequency which when received simultaneously with the voice modulation will mask the latter. When a null of the rotating pattern lies in the direction of the aircraft the pilot will hear only the voice reciting the bearing of the aircraft from the station, and his direction from the station can be thereby established.

The presence of the masking tone between null intervals is necessary to prevent the pilot from receiving erroneous bearing information, but since it is a continuous high pitched sound of moderate volume, it can be a source of considerable irritation and fatigue.

Accordingly, it is an object of the invention to provide bearing receiver equipment retaining the advantages of the aural bearing presentation described above, but eliminating the undesirable masking tone from the pilot's earphones during intervals between nulls.

It is a further object of the invention to provide a switch operated by the presence of a masking tone to disconnect a listening device from a receiver whereby only desirable portions of the receiver output will be heard.

It is a further object of the invention to provide omnidirectional bearing receiving equipment which produces a bearing signal only when desired bearing information is being transmitted.

Other objects and further advantages of the invention will become apparent to those skilled in the art upon reading the following description in the light of the accompanying drawing.

I shall first describe an embodiment of my invention, and shall then point out the novel features thereof in claims.

In the drawing, the sole figure is a wiring diagram of an omnidirectional bearing receiver in accordance with one embodiment of the invention.

Referring to the drawing, the air-borne equipment required for receiving bearing information and providing an aural indication thereof according to the system disclosed in the above mentioned Weihe application essentially comprises a receiver 2 having an antenna 1, and a listening device 6 such as a pair of headphones connected to the receiver output over lead 60.

As shown, the listening device is operatively connected to the receiver when the arm of relay 4 connected to lead 60 is connected over back contact 3 of the relay. Relay 4 is operated in a manner to be hereinafter described to accomplish the purposes of my invention.

As noted above, the signal appearing on antenna 1 of receiver 2 comprises both voice announcements of bearing and an intermittent masking tone signal which at times is received simultaneously with the voice announcements to mask undesirable announcements. Receiver 2 demodulates the input signal and has an output incorporating the audio frequencies of the voice announcement and the tone frequency, which may be of any selected frequency within the audio range. A portion of the receiver output is fed through resistor 8 to wiper 9 of potentiometer 11 to operate relay 4 in a manner which will now be described.

A portion of the receiver output voltage corresponding to the position of wiper 9 on grounded resistor 10 is applied to resistor 13 of twin-T network 12. This network is a band-rejection filter of known design, having resistances 16 and 17 and condenser 18 constituting one T, and capacitances 14 and 15 and resistor 13 constituting the second T.

The twin-T network is connected in a degenerative feedback path between the plate and grid of an electron discharge device such as tube 20.

Tube 20 has a cathode 21 provided with a biasing resistor 22 and an audio by-pass capacitor 23 to ground. Operating voltage for the tube is supplied from a battery conventionally indicated at B+ through resistor 29 to terminal 25 connected to plate 24. The initial grid control potential may be considered to be induced primarily through capacitor 15 and resistance 13 from the potential developed on potentiometer 11. A network comprising capacitor 26 and resistance 28 is connected between the plate and ground, and a degenerative feedback through network 12 is provided by connections between the terminals of network 12 to terminal 27 and to the grid, respectively.

Network 12 is connected as a rejection network for the masking tone frequency. Two signal paths are provided between terminal 27 and grid 19. Current may flow from terminal 27 through resistor 17 and capacitance 18 to ground. The voltage across capacitor 18 is applied through resistor 16 to grid 19 to constitute a first path. Current may also flow from terminal 27 through capacitance 14, resistance 13 and potentiometer 10 to ground. The potential between the top of resistor 13 and ground is applied to grid 19 through condenser 15, comprising a second signal path. At the masking tone frequency, the voltages applied by the two paths are equal and opposite in phase, so that there is no feedback at the tone frequency. However, at higher frequencies and lower frequencies than the tone frequency, the impedance of one of the paths becomes higher than the other, permitting a component of the plate output to be applied to the grid 180° out of phase with the input signal on wiper 9. Accordingly, tube 20 operates as a band-pass filter and amplifier having an output of the masking tone frequency proportional to the masking tone input times the gain of the tube.

The output of the tube 20 is coupled to grid 32 of amplifier 35 through capacitor 30. Tube 35 might be replaced by any suitable amplifier, but as here shown is conventionally connected, with power supplied from B+ through resistor 36, and a conventional biasing resistor 31 between grid and cathode.

The amplified output of tube 35 is coupled to a diode voltage doubler-rectifier through condenser 37. Condenser 37 charges through diode 39 on the postive half cycle and discharges through diode 38 and condenser 40 on the negative half cycle in series with the negative pulse to produce a half-wave voltage across condenser 40 at twice the input voltage in a conventional manner. The network is maintained above ground by means of potential divider 43, 44 connected between the power supply and ground. Resistors 41 and 42 are connected across capacitor 40, and grid 46 of following tube 49 is connected between resistors 41 and 42 as shown. Capacitor 45 is connected between grid 46 and ground to average the output of the voltage doubler so that transient signals of the tone frequency will have no effect on the following stage.

Tubes 49 and 58 are connected as a monostable multivibrator, with tube 49 normally conducting and tube 58 normally cut off by the voltage across resistor 54 applied through resistor 53 from plate 48 of tube 49. Power is supplied to the tube 49 through resistor 50, and power is supplied to tube 58 through the coil of relay 4 from B+ as shown. The cathodes of tubes 49 and 58 are maintained at substantially the same level above ground as the voltage doubler circuit by means of resistors 51 and 52 connected between the battery and ground and having an intermediate connection to the cathodes of the multivibrator tubes as shown. Relay 4 is operated through lead 59 from plate 56 of tube 58 when that tube begins conduction after tube 49 is driven to cut-off.

In operation, the pilot tunes receiver 2 to the frequency of the range station with respect to which orientation is desired. At this time, listening device 6 is connected to the receiver over back contact 3 of relay 4.

As reception begins, assuming that the masking tone is being received at that time, band-pass amplifier 20 selects the masking tone from the receiver output and, after amplification in tube 35 and voltage doubling in tubes 38 and 39 in the manner previously described, a negative-going voltage is produced across condenser 45 and applied to grid 46 of tube 49. When this voltage builds up to a sufficient level, tube 49 is cut off and the voltage at plate 46 rises, whereupon conduction begins in tube 58. Conduction in tube 58 causes an increase in the voltage at cathode 57 of tube 58 and also at cathode 47 of tube 49, since these cathodes are interconnected. This substantially simultaneous decrease in grid voltage and increase in cathode voltage of tube 49 causes a fast regenerative changeover in the multivibrator and maximum operating voltage for relay 4 is immediately applied from plate 56 of tube 58 through lead 59. This regenerative relay control circuit eliminates relay chatter when the current through the relay coil is near the pull-in and drop-out values and provides superior resistance to mechanical vibration.

The relay operates to connect lead 60 of receiver 2 over front contact 5 through resistor 7 to ground, disconnecting the listening devices while the masking tone is present. Resistor 7 is provided so that the load on the receiver will be maintained substantially constant regardless of the position of the relay. When the null of the rotating pattern at the ground stations is in the direction of the aircraft, the masking tone will cease to be received and the charge on condenser 45 will leak off through resistors 42 and 44 to ground. Tube 49 will then begin to conduit, cutting off tube 58 and dropping out relay 4 to reconnect the listening device to the receiver over back contact 3 of the relay. The pilot will then hear a series of bearing announcements in the neighborhood of his bearing so that by interpolation he can establish a line of position.

It will be noted that the relay operating circuit in the preferred embodiment shown is basically a band-pass filter of increased sensitivity and selectivity. Since the circuit shown could be replaced by a band-pass filter without loss of many of the basic functions of my invention, such a construction is not to be excluded from the broader aspects of the invention.

While I have described an embodiment of my invention in detail, it will be apparent to those skilled in the art upon reading this disclosure that many changes and modifications could be made within the scope of the invention. Accordingly, I do not wish to be limited to the details shown, but only by the scope of the following claims.

Having thus described my invention, what I claim is:

1. In navigational apparatus, in combination, a navigational receiver having an audio output, means connecting said receiver to a listening device, switching means in said connecting means for disconnecting said receiver from said device, an amplifier connected to said receiver output, said amplifier having a degenerative feed-back path comprising a rejection network tuned to a predetermined frequency, and a monostable multivibrator controlled by said amplifier for operating said switching means when said receiver output contains a substantial component of said predetermined frequency.

2. Apparatus of the class described, comprising, in combination, a receiver adapted to detect periodically transmitted announcements and an intermittent tone of predetermined frequency masking some of said announcements, a listening device connected to said receiver through a switching device, a bandpass network adapted to amplify said tone frequency selectively, an averaging network controlled by said band-pass network, a monostable multivibrator comprising a first normally conductive electron discharge device and a second electron discharge device normally driven to cut-off by said first discharge device, said first discharge device being connected to said averaging network to be driven to cut-off by a sustained output from said band-pass network, whereby said second discharge device is rendered conductive, and means connecting said second discharge device to said switching device for disconnecting said listening device from said receiver, whereby said listening device is responsive to said announcements only in the absence of said intermittent tone.

3. An omnidirectional range receiver for aerial navigation, comprising, in combination, a demodulating detector having an audio output, means connecting said output to an arm of a relay having a front contact grounded through a resistor and a back contact connected to a listening device, a band-pass amplifier tuned to a predetermined frequency within the range of said audio output, an averaging network connected to said band-pass network and having a substantial output only when said predetermined frequency is a sustained component of said detector output, a multivibrator comprising a pair of tubes, the first normally conducting and driving the second to cut-off, means connecting said averaging network to said first tube for driving said first tube to cut-off, and means connecting said sound tube to said relay.

4. A bearing signal selector, comprising, in combination, a receiver adapted to detect bearing signals and a tone signal of predetermined frequency transmitted intermittently with said bearing signals, a listening device, means connecting said receiver to said device, said means including switching means, band-pass filter means responsive to said tone signal frequency, an averaging network operatively connected to said filter means, a first tube having a grid connected to said averaging network, a plate, and a cathode, a second tube having a grid coupled to the plate of said first tube, a plate, and a cathode coupled to said first tube cathode whereby conduction in said first tube is regeneratively cut off by a voltage developed by said averaging network and by the rise in cathode voltage associated with conduction in said second tube, and means connecting the plate of said second tube to said switching means for disconnecting said receiver from said listening device when a substantial component of said tone signal frequency is detected.

5. In a bearing signal selector for aerial navigation systems wherein bearing announcement signals are broadcast omnidirectionally simultaneously with a rotating directional tone signal of fixed frequency and a receiver is provided for detecting said broadcast signals, means for connecting said receiver to a listening device only when said tone signal is not being received, said means comprising, an amplifier adapted to be connected to said receiver, said amplifier having a degenerative feed-back path comprising a rejection network tuned to said tone frequency, a listening device normally connected to said receiver, and relay means responsive to the output of said amplifier for disconnecting said listening device from said receiver when said tone signal is received.

6. In a bearing signal selector for aerial navigation systems wherein bearing announcement signals are broadcast omnidirectionally simultaneously with a rotating directional tone signal of fixed frequency and a receiver is provided for detecting said broadcast signals, a listening device, relay actuated switching means connecting said receiver to said listening device, a first electron tube including a plate, a control grid and a cathode, a degenerative feedback network connected between said plate and said control grid of said first tube, said feedback network including band-rejection filter means responsive to said tone signal to provide self cancellation of said tone signal, said first tube being rendered conductive at the tone signal due to cancellation of said tone signal in said degenerative feedback circuit, a monostable multivibrator, means coupling the output of said first tube to said multivibrator, and said multivibrator being energized in response to conduction in said first tube to actuate said relay actuated switching means to disconnect said receiver from said listening device.

7. In a bearing signal selector for aerial navigation systems wherein bearing announcement signals are broadcast omnidirectionally simultaneously with a rotating directional tone signal of fixed frequency and a receiver is provided for detecting said broadcast signals, a listening device, relay actuated switching means connecting said receiver to said listening device, a first electron tube including a plate, a control grid and a cathode, a degenerative feedback network connected between said plate and said control grid of said first tube, said feedback network including band-rejection filter means responsive to said tone signal to provide self cancellation of said tone signal, said first tube rendered conductive at the tone signal due to cancellation of said tone signal in said degenerative feedback circuit, amplifying means coupled to the output of said first tube, a voltage doubling network coupled to said amplifying means, an averaging network to minimize the effect of transient signals coupled to said voltage doubling network, a monostable multivibrator being energized in response to conduction in said first tube to operate said relay actuated switching means to disconnect said receiver from said listening device.

References Cited in the file of this patent

UNITED STATES PATENTS

| | | |
|---|---|---|
| 2,279,031 | Cockerell et al. | Apr. 7, 1942 |
| 2,424,079 | Dome | July 15, 1947 |